(12) United States Patent
Nigro

(10) Patent No.: US 7,693,414 B1
(45) Date of Patent: Apr. 6, 2010

(54) BATTERY ADAPTER FOR A HAND-HELD CAMERA

(76) Inventor: Paul Nigro, 2795 Milburn Ave., Baldwin, NY (US) 11510

( * ) Notice: Subject to any disclaimer, the term of this patent is extended or adjusted under 35 U.S.C. 154(b) by 355 days.

(21) Appl. No.: 11/789,567

(22) Filed: Apr. 26, 2007

Related U.S. Application Data

(60) Provisional application No. 60/800,582, filed on May 16, 2006.

(51) Int. Cl.
*G03B 13/02* (2006.01)
*G03B 17/02* (2006.01)
*H04N 5/225* (2006.01)

(52) U.S. Cl. ........................ 396/373; 396/539; 348/341; 348/376

(58) Field of Classification Search ................. 396/535, 396/539, 277, 373; 348/375, 341, 373, 376
See application file for complete search history.

(56) References Cited

U.S. PATENT DOCUMENTS 5,068,683 A * 11/1991 Miyazaki ................... 396/198

* cited by examiner

*Primary Examiner*—Rochelle-Ann J Blackman
(74) *Attorney, Agent, or Firm*—Myron Amer PC

(57) ABSTRACT

An adapter in an interposed position between a hand-held camera and a battery for operating the camera in facing relation to each other in the clearance therebetween the camera-attached adapter positions an eyepiece of the camera so the camera user makes eye contact against the eyepiece despite the physical obstacle of the battery.

1 Claim, 3 Drawing Sheets

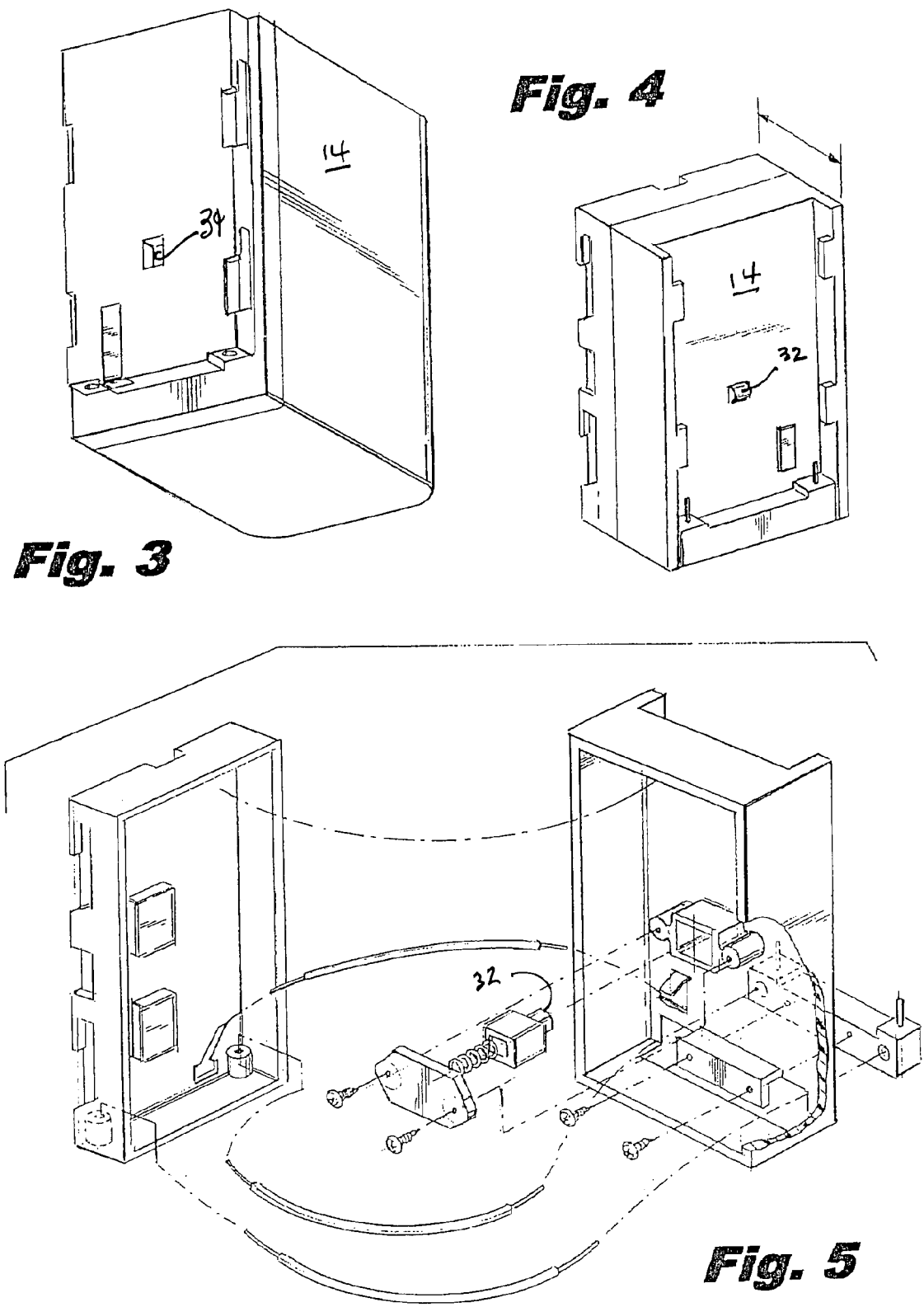

BATTERY ADAPTER FOR A HAND-HELD CAMERA

BACKGROUND OF THE INVENTION

Field of Search

The present invention is an adapter for a hand-held camera structurally constituted and used in combination with the hand-held camera.

A hand-held camera, generally designated 10, is operated by a battery pack 12, and typically the attachment of these two components is achieved by an interposed connecting component, known in trade parlance as an adapter, herein generally designated 14. Functionally, the adapter 14 completes an electrical circuit between the battery pack 12 and camera 10.

A prior art shortcoming to which this invention is addressed and solves, is that known adapters have a width expanse or dimension which is of too great an extent so that eye contact cannot be made with the photographing position of the camera eye piece 16, all as will be better understood as the description proceeds.

SUMMARY OF THE PRESENT INVENTION

More particularly, the hand-held camera 10 is of the type having the noted eye piece 16 mounted for a pivotal traverse, as at 18, so it extends from a vertical position to a rearwardly extending position in the photographing use of the camera, and in said rearward position a user 20 makes eye contact, as at 22, with the eye piece 16 achieving proper focusing of the camera 10. In prior art adapters, their width is excessive, and the user cannot get close enough to the eye piece for proper focusing of the camera.

BRIEF DESCRIPTION OF THE DRAWING

FIG. 3 is an isolated perspective view illustrating details circumscribed by the arrow 3 of FIG. 2 of the prior art adapter;

FIG. 4 is a view similar to FIG. 3 illustrating details circumscribed by the arrow 4 of FIG. 2 of the prior art adapter;

FIG. 5 is an exploded view of the within inventive adapter;

DETAILED DESCRIPTION OF THE PREFERRED EMBODIMENT

Figure 1:
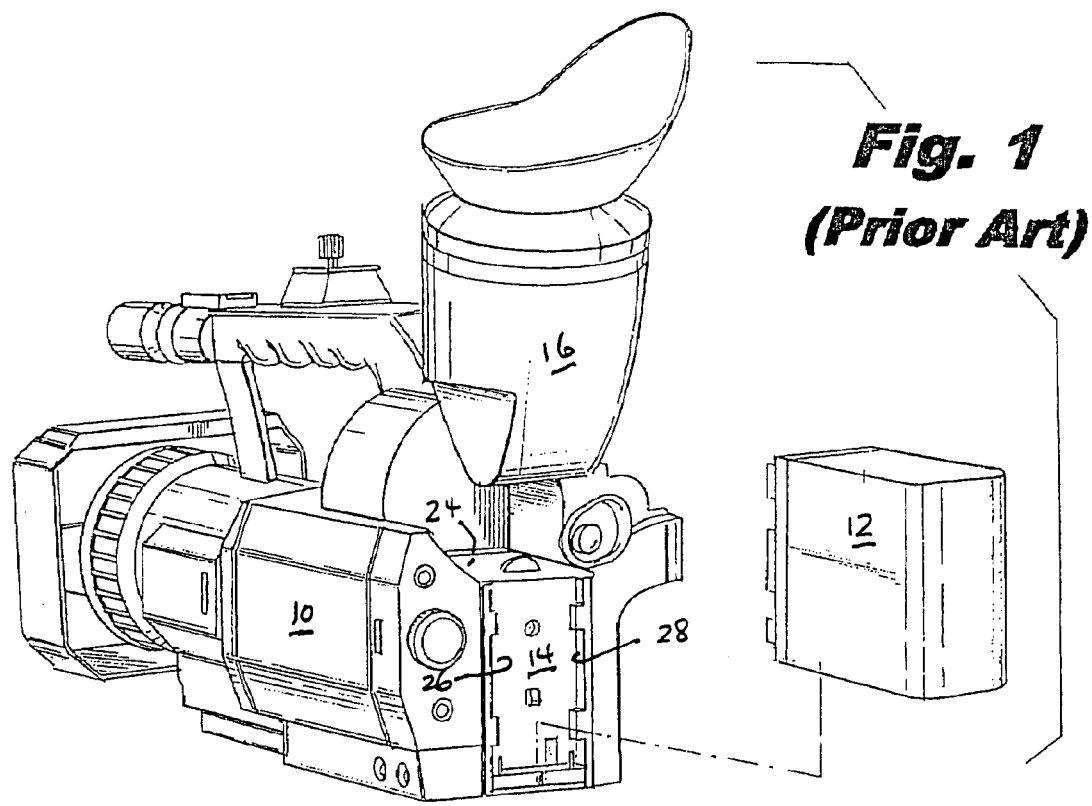
FIG. 1 is an exploded perspective view of a hand-held camera and prior art adapter and battery pack for operating the camera.
Figure 2:
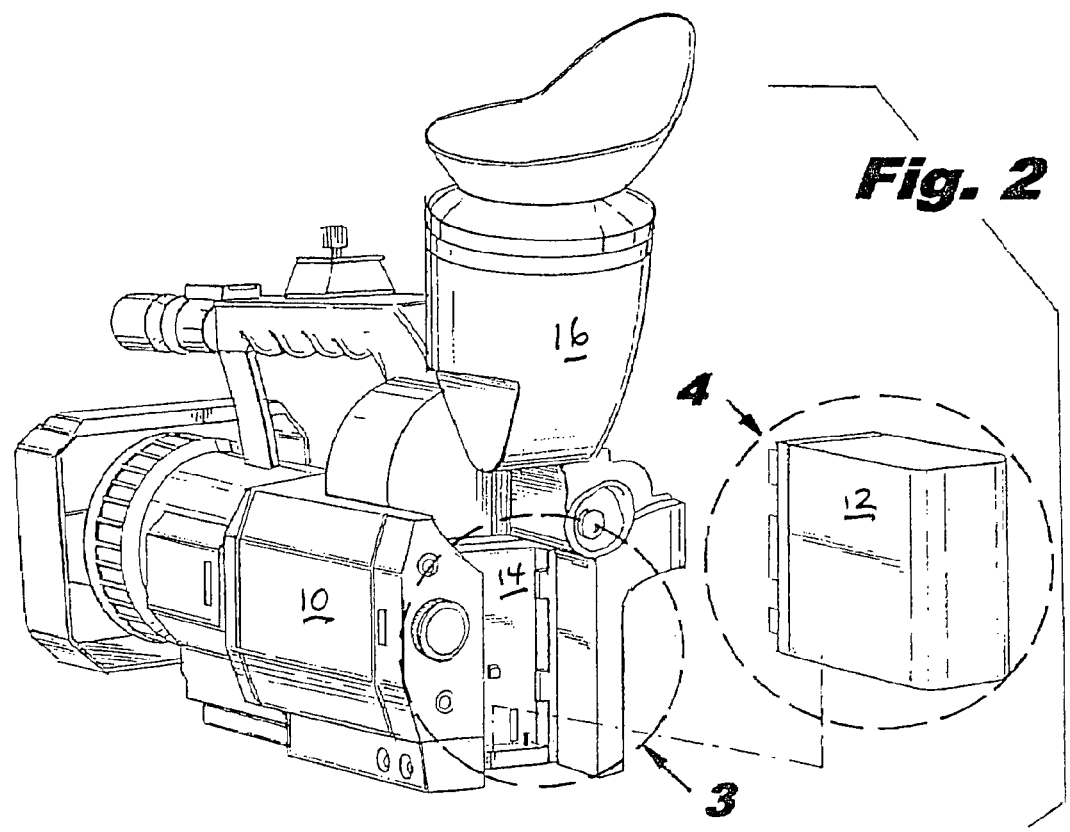
FIG. 2 is similarly a perspective view projected from FIG. 1 but at an angular orientation illustrating details of the adapter and battery pack.
Figure 6:
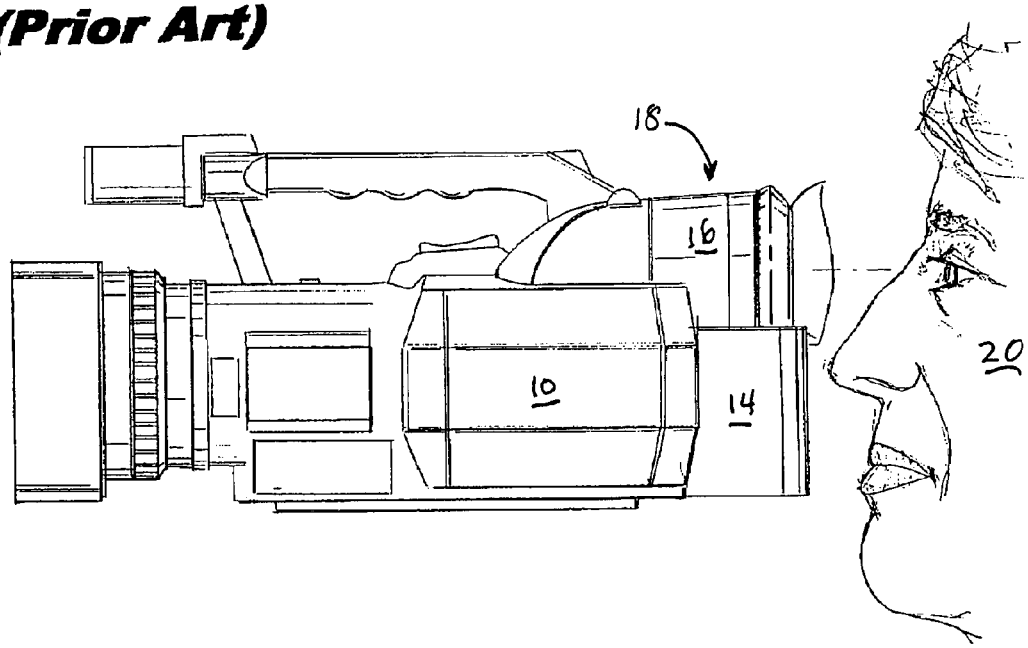
FIG. 6 is a side elevational view of the assembly of the camera, adapter and battery pack illustrating a shortcoming in the assembly.
Figure 7:
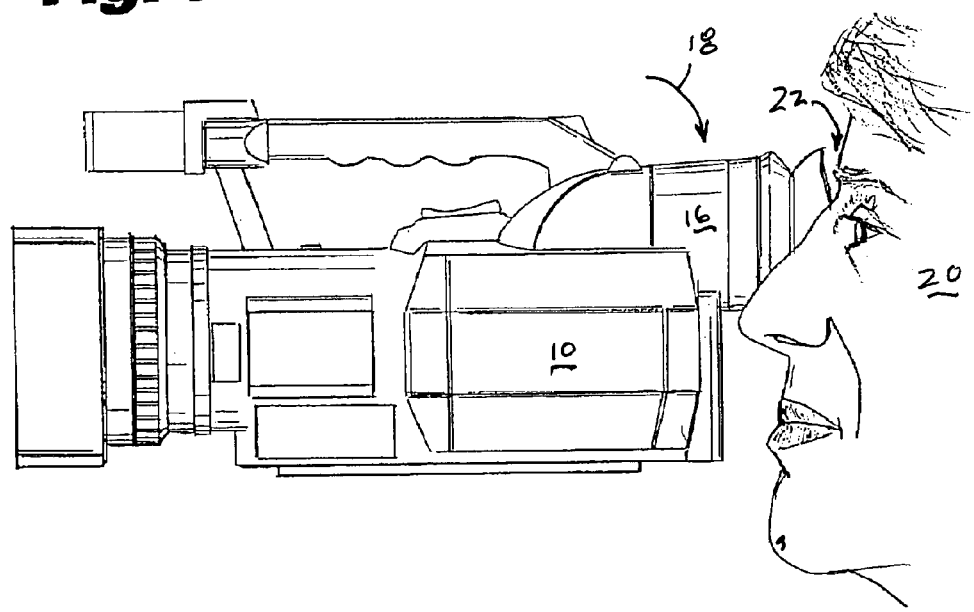
FIG. 7 is a view similar to FIG. 6, but illustrating the overcoming of the shortcoming.

Preparatory to attachment of the battery pack 12 to the camera 10, the battery or battery pack 12 and camera 10 are in spaced apart relation, as illustrated, wherein the camera 10 has a recessed rear mounting surface 24 in facing relation to the battery pack 12, to which there is provided a first cooperating pair of connectors 26 destined for holding in attached relation the battery pack 12, and also provided is a second cooperating pair of connectors 28 on the battery pack 12 destined for achieving attachment to the camera 10.

Adapter 14 has an operative interposed position between the first and second connectors 26, 28, and more notable, has a width expanse 30 of a selected nominal extent which contributes to obviating a camera user being unable to make contact with the camera eye piece 16, i.e., the width expanse 30 is small enough or of such nominal extent that eye contact with the eye piece 16 is without a clearance therebetween.

To this end, the adopter 14 has an electric circuit-closing enablement in the special nature of an externally protruding but internally spring biased detent 32, which snaps into an access opening 34 of the battery pack 12 and which completes the electrical circuit enabling battery operation of the camera 10.

In practice, the detent enabled adapter 14 of the present invention measures ¾ inches, in replacement of otherwise prior art enabled adapter which measures 2 inches.

While the adapter for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. An adapter for a camera when hand held for the focusing by sighting through an eye piece thereof and a rear surface for receiving in attached relation a camera-operating battery without impeding said eye piece-focusing, said adapter comprising in combination:
    A. said battery having a top surface and said hand-held camera having an eye piece and operative clearance positions of said top battery surface and said eye piece in parallel relation to each other such that the focusing by said sighting through said eye piece is not impeded;
    B. a first and second cooperating pair of connectors of which said first connector has an operative position in attached relation to said battery and said second connector has an operative position in attached relation to said hand-held camera;
    C. said adapter having an operative interposed position between said first and second connectors having
        (1) a width expanse of a selected nominal extent;
        (2) an electrical circuit-closing detent in facing relation to said battery-attached connector; and
        (3) an operative position of said adapter in a detent-effectuated attachment to said battery-attached connector;
whereby said nominal width of said adapter is selected to contribute to obviating a camera user's contact with said camera eye piece.

* * * * *